W. H. MARTIN.
BORING MACHINE.
APPLICATION FILED JULY 22, 1919.
1,356,871. Patented Oct. 26, 1920.
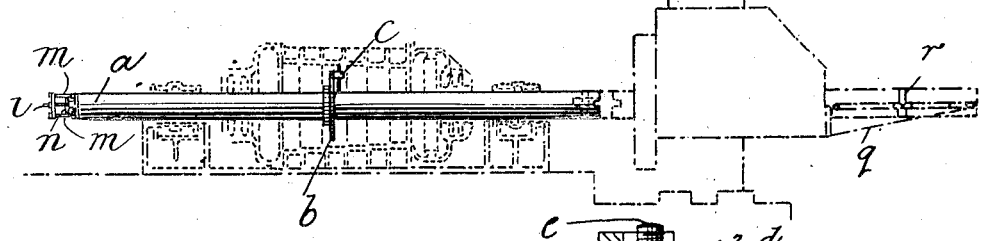
FIG. 1.
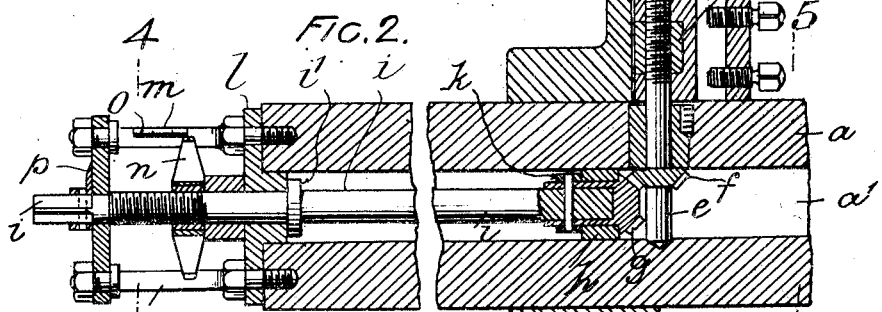
FIG. 2.
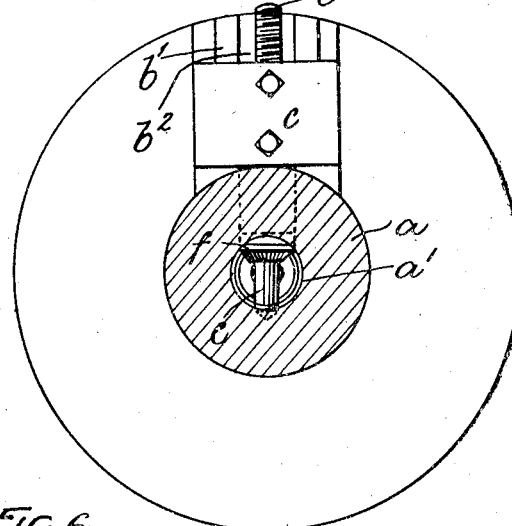
FIG. 5.
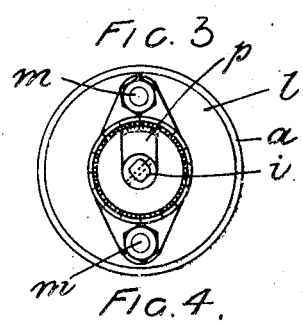
FIG. 3.
FIG. 4.
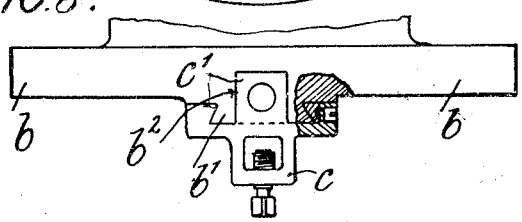
FIG. 6.
William Hamilton Martin
By Davis & Davis
Attys

UNITED STATES PATENT OFFICE.

WILLIAM HAMILTON MARTIN, OF FLUSHING, NETHERLANDS.

BORING-MACHINE.

1,356,871.     Specification of Letters Patent.     Patented Oct. 26, 1920.

Application filed July 22, 1919. Serial No. 312,546.

*To all whom it may concern:*

Be it known that I, WILLIAM HAMILTON MARTIN, a subject of the Queen of Holland, residing at Flushing, the Netherlands, have invented Improvements Relating to Boring-Machines, of which the following is a specification.

This invention has for its object to enable the tools of boring bars to be adjusted radially from outside the work and is more especially intended for enabling turbine casings having stepped diameters corresponding to the various stages of expansion to be bored without the necessity of removing the bar or the top half of the casing to afford access to the tool adjusting means each time a step or part of larger or smaller diameter than that for which the tools are set is to be bored.

For this purpose the boring bar of a boring machine is hollow and the tool holder is mounted to slide in a radial guide formed in the face of a collar-like head fixed on it, the said holder being adjust-fixed by a radial screw which extends into the bar and is there geared, as by bevel pinions, to a shaft which projects through the end of the bar where it is provided with means for turning it and indicating the corresponding radial position of the tool. Usually the bar is capable of being rotated and traversed and a suitable scale, which may be adjustable, is provided on the machine and is adapted in conjunction with a pointer on the bar to indicate the position of the tool longitudinally with regard to the work.

The accompanying drawings illustrate one arrangement, Figure 1 showing the boring bar in elevation, the boring machine parts and the work being indicated by dotted lines. Fig. 2 is a longitudinal section of the boring bar, Fig. 3 is an end view, Fig. 4 a section on the line 4—4 of Fig. 2, Fig. 5 a section on the line 5—5 Fig. 2 and Fig. 6 shows half in plan and half in section the tool holder.

In this arrangement, about the middle of the length of a hollow extension $a$ of the boring bar of the machine, is fixed a collar-like head $b$. The face of the head $b$ is formed with a dovetail radially arranged projection $b'$ which is embraced by a tool holder $c$ formed with a pair of apertured lugs $c'$ which extend into a slot $b^2$ formed in the head $b$ and hold between them a nut $d$ engaged by a radially arranged screw threaded spindle $e$ that extends through a hole $a'$ in the wall of the hollow extension bar $a$, its inner end resting in a step bearing on the opposite side of the wall. The spindle $e$ is formed or provided with a bevel pinion $f$ located within the hollow extension bar and engaged by another bevel pinion $g$ carried in a bearing block $h$ and having a hollow stem which receives the end of an operating shaft $i$ secured to it by a cotter that passes through the shaft, the stem and a collar $k$ beyond the bearing block over which collar the smaller end of the cotter is riveted. The outer end of this shaft passes through a bearing plate $l$ fitting the end of the hollow extension bar and abutting against a collar $i'$ on the shaft; the bearing plate is secured by elongated studs $m$ forming guides for an index piece $n$ which is threaded upon a threaded portion of the shaft so that, as the shaft is turned, as by means of a crank handle fitted to its outer end, the index piece moves over a scale indicated at $o$ as marked on one of the studs. The outer ends of the studs carry a cross member through which also extends the shaft $i$ which has fixed to it a graduated index $p$ moving over a suitable dial on the cross member. The scales are so calibrated that the position of the tool radially of the boring bar can be accurately determined.

The longitudinal position of the tool may be determined by a scale carried by an arm $q$ projecting from the rear of the boring machine standard alongside the tail end of the boring bar proper which has a pointer $r$ fixed to it, the scale or the pointer being adjustable to suit the position of the work on the work table.

What I claim is:—

1. In a machine of the kind referred to, a hollow boring bar having a hole in the wall thereof intermediate of its length, a head secured to the boring bar to one side of the hole aforesaid, such head being formed with a radially arranged dovetail projection and a slot between the dovetail edges, a toolholder formed with a pair of apertured lugs which extend into the slot aforesaid, a nut disposed between such lugs, a radially arranged screw threaded spindle passing through the said lugs, and nut and hole in the wall of the boring bar and having its inner end mounted in a step bearing formed in the opposite side of the wall, bevel gearing within the boring bar adapted to turn the radially arranged screw threaded spindle and a shaft within and projecting beyond one end of the bar for operating said gearing, the screw threaded spindle being relieved of lateral thrust which is instead transmitted to the head through the tool holder.

2. In a machine of the kind referred to, a longitudinally movable hollow boring bar having a hole in the wall thereof intermediate of its length, a head secured to the boring bar to one side of the hole aforesaid, such head being formed with a radially arranged dovetail projection and a slot between the dovetail edges, a tool holder formed with a pair of apertured lugs which extend into the slot aforesaid, a nut disposed between such lugs, a radially arranged screw threaded spindle passing through the said lugs, nut and hole in the wall of the boring bar and having its inner end mounted in a step bearing forward in the opposite side of the wall, bevel gearing within the boring bar adapted to turn the radially arranged screw threaded spindle, a shaft within and projecting beyond one end of the bar for operating said gearing and indicating devices one movable axially and the other circularly with rotation of the shaft whereby such rotation is determined in whole numbers and in fractions.

Signed at Flushing, Holland, this 24th day of June, 1919.

WILLIAM HAMILTON MARTIN.